US008258790B2

(12) United States Patent  (10) Patent No.: US 8,258,790 B2
Folberth et al. (45) Date of Patent: Sep. 4, 2012

(54) OSCILLATOR SENSOR FOR DETERMINING A PROPERTY OF AN EARTH FORMATION

(75) Inventors: Martin Folberth, Lower Saxony (DE); Matthias Gorek, Lower Saxony (DE); Eduard Kirchmeier, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 823 days.

(21) Appl. No.: 12/274,414

(22) Filed: Nov. 20, 2008

(65) Prior Publication Data

US 2010/0123461 A1 May 20, 2010

(51) Int. Cl.
*G01V 3/10* (2006.01)
(52) U.S. Cl. ........ 324/339; 324/327; 324/337; 324/335; 324/342
(58) Field of Classification Search ............ 324/327, 324/337, 335, 334
See application file for complete search history.

(56) References Cited

U.S. PATENT DOCUMENTS

| | | | | |
|---|---|---|---|---|
| 4,701,712 A | * | 10/1987 | Seeley et al. ............ | 324/340 |
| 5,065,099 A | * | 11/1991 | Sinclair et al. ............ | 324/339 |
| 5,191,290 A | * | 3/1993 | Gianzero et al. .......... | 324/374 |
| 5,452,761 A | * | 9/1995 | Beard et al. ............. | 324/323 |
| 5,689,068 A | * | 11/1997 | Locatelli et al. ........ | 73/152.02 |
| 5,796,252 A | * | 8/1998 | Kleinberg et al. ........ | 324/303 |
| 6,655,464 B2 | * | 12/2003 | Chau et al. ............ | 166/380 |
| 6,903,553 B2 | | 6/2005 | Itskovich et al. | |
| 7,228,903 B2 | | 6/2007 | Wang et al. | |
| 7,299,131 B2 | | 11/2007 | Tabarovsky et al. | |
| 7,427,862 B2 | * | 9/2008 | Dashevsky et al. ....... | 324/339 |
| 2004/0010373 A1 | * | 1/2004 | Smits et al. ............ | 702/6 |
| 2006/0214664 A1 | | 9/2006 | Folberth et al. | |
| 2008/0068025 A1 | | 3/2008 | Gold et al. | |

OTHER PUBLICATIONS

Inez C. Goncalves, et al. "Resistivity Well Logging". GIMMC Workshop—Resistivity Well Logging. 2002.
International Search Report and Written Opinion, Mailed Jul. 5, 2010, International Appln. No. PCT/US2009/064514, Written Opinion 8 Pages, International Search Report 7 Pages.

* cited by examiner

*Primary Examiner* — Richard Isla Rodas
(74) *Attorney, Agent, or Firm* — Cantor Colburn LLP

(57) ABSTRACT

An apparatus for evaluating an earth formation, the apparatus including: a logging tool configured to be conveyed through a borehole penetrating the earth formation; a coil inductively coupled to the earth formation, the coil being disposed at the logging instrument; and a circuit coupled to the coil wherein the circuit and the coil form an oscillator circuit, the oscillator circuit being configured to oscillate when a circuit parameter of the oscillator circuit satisfies an oscillation criterion, the circuit parameter being related to a property of the earth formation.

19 Claims, 14 Drawing Sheets

OSCILLATOR SENSOR FOR DETERMINING A PROPERTY OF AN EARTH FORMATION

BACKGROUND OF THE INVENTION

1. Field of the Invention

The present invention is related to imaging electrical properties of an earth formation surrounding a borehole. In particular, the imaging can be performed in a borehole containing a non-conductive mud therein.

2. Description of the Related Art

Exploration and production of hydrocarbons requires measurements of properties of geologic formations that may contain a reservoir of the hydrocarbons. Many of the measurements are performed from a borehole penetrating the formations. Properties of a particular formation provide information to geophysicists or petroanalysts for constructing a model of the formation. The model may be used for making decisions that efficiently use resources for the exploration and production. For example, the model together with technology to steer a drill bit (i.e., "geosteering") allow the drilling engineer to accurately navigate through formations avoiding trouble spots to reach an ideal location in a target formation.

Taking these measurements in a borehole is generally referred to as "well logging". Well logging includes wireline logging and logging-while-drilling (LWD). In wireline logging, a logging instrument that performs the measurements is disposed in the borehole while being supported by an armored cable. The armored cable extends through the borehole to the surface of the earth. The cable is also used to communicate the measurements to a processor at the surface of the earth. In LWD, the measurements are performed while drilling is being conducted or during a temporary halt. The logging instrument used for LWD is generally disposed in a drill collar surrounding a drill pipe in the vicinity of the drill bit.

Many different types of measurements of properties of a formation can be performed in the borehole. One type involves measuring the resistivity or conductivity of the formation. The resistivity or conductivity can then be correlated to the composition of the formation. Changes in resistivity or conductivity can be used to indicate boundaries between different types of materials in the formation.

An induction logging instrument measures resistivity by inducing alternating current loops in the formation. The induction instrument then measures current induced in a receiver coil caused by an alternating magnetic field resulting from the current loops. The induced current is then correlated to the resistivity. A traditional prior-art induction logging instrument comprises three antennas (or coils), one transmitter antenna and two receiver antennas to perform a differential or relative measurement of the received voltages in the frequency range from approximately 1 kHz to 10 MHz. These instruments perform a bulk resistivity measurement of the surrounding formation, i.e. they provide resistivity information for a relatively large volume of formation surrounding the receiver antennas. The longitudinal dimension of this volume is in the order of magnitude of the receiver antenna spacing and such instruments have no azimuthal directivity.

Induction logging instruments can be used in both conductive drilling fluid (i.e., mud) and non-conductive drilling fluid. Exact values of resistivity depend on the frequency of interest.

Another area of interest for resistivity measurements downhole is the so-called resistivity imaging. In conductive drilling mud, usually a button electrode is deployed on a downhole tool, surrounded by one or more shielding or guard electrodes and a return electrode. The button electrode current is focused into the formation and the formation resistivity can be derived from measuring the button electrode current and voltage. This takes place in the frequency range from DC to a few kHz. The conductive drilling mud in this case supports this galvanic measurement by providing a current path through the mud, whereas non-conductive drilling mud can be considered to be non-conductive in this frequency range. This provides a challenge for an imaging instrument disposed in nonconductive drilling mud. Conventional techniques used in conductive drilling mud cannot be used and traditional induction logging techniques are not easily adaptable to the frequency range deemed suitable for imaging instruments in non-conductive drilling mud (approx. 10 MHz to 200 MHz).

Therefore, what are needed are techniques to measure resistivity or conductivity of a formation from a borehole containing non-conductive fluid. Preferably, the techniques may be used in wireline logging or LWD applications.

BRIEF SUMMARY OF THE INVENTION

Disclosed is an embodiment of an apparatus for evaluating an earth formation, the apparatus including: a logging tool configured to be conveyed through a borehole penetrating the earth formation; a coil inductively coupled to the earth formation, the coil being disposed at the logging instrument; and a circuit coupled to the coil wherein the circuit and the coil form an oscillator circuit, the oscillator circuit being configured to oscillate when a circuit parameter of the oscillator circuit satisfies an oscillation criterion, the circuit parameter being related to a property of the earth formation.

Disclosed is one example of a method for evaluating an earth formation, the method including: conveying a logging tool through a borehole penetrating the earth formation; determining a circuit parameter that causes an oscillator circuit to oscillate, the oscillator circuit being configured to oscillate when an oscillation criterion is met, the oscillator circuit comprising a coil inductively coupled to the earth formation, wherein the oscillator circuit and coil are disposed at the logging tool, wherein the oscillator circuit and coil are disposed at the logging tool; and estimating a property of the earth formation from the circuit parameter.

Further disclosed is a computer program product stored on machine-readable media for estimating a property of an earth formation, the product having machine-executable instructions for implementing a method that includes: determining a circuit parameter that causes an oscillator circuit to oscillate, the oscillator circuit being configured to oscillate when an oscillation criterion is met, the oscillator circuit comprising a coil inductively coupled to the earth formation, wherein the oscillator circuit and coil are disposed at the logging tool; estimating a property of the earth formation from the circuit parameter; and recording the property.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
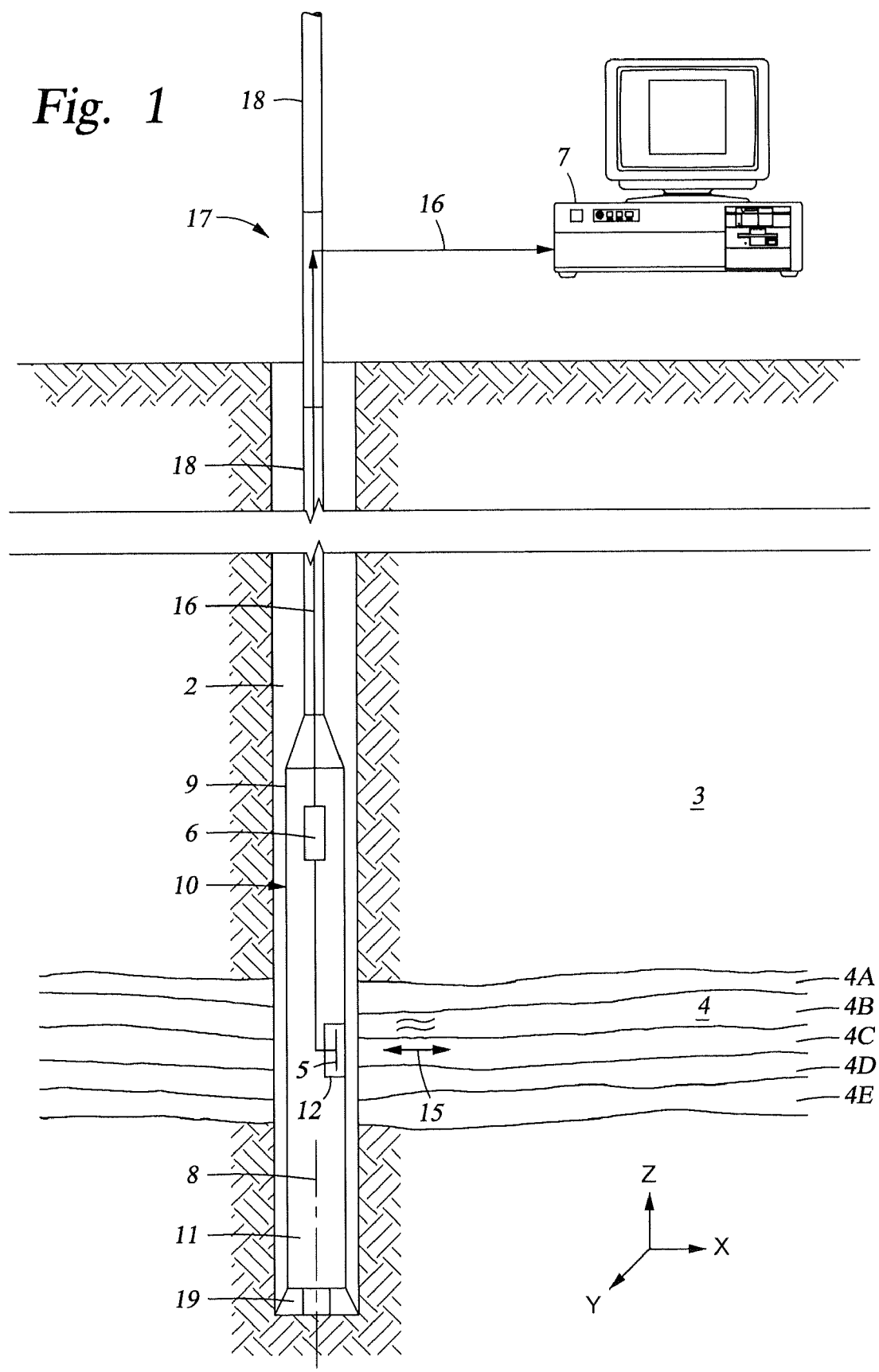
FIG. 1 illustrates an exemplary embodiment of a logging instrument disposed in a borehole penetrating the earth.

Disclosed are embodiments of techniques for evaluating an earth formation with an induction logging instrument having a single sensor. The single sensor addresses the challenge of imaging the earth formation from a borehole containing non-conductive drilling fluid by using a single antenna (or coil). The single antenna by being small enough to provide a reasonable resolution (in the same order of magnitude as the diameter of the coil or loop) and to be mounted on a sleeve stabilizer in a downhole instrument. The sensor can be placed close to an exterior surface of the logging instrument and is inductively coupled to the surrounding formation. The single sensor resonates with an electromagnetic signal (i.e., electromagnetic energy) from the earth formation effectively acting as both a transmitter and a receiver. In principle, a direct coil impedance or admittance measurement can be performed and the real part of such a measurement be used as a measure for the formation resistivity.

The techniques, which include apparatus and method, call for an oscillator circuit to be included in the sensor. The oscillator circuit generally has an active device such as a transistor. In one example, the techniques call for adjusting a circuit parameter of the active device such as collector current until the circuit oscillates. The amount of collector current required to make the circuit oscillate can then be related to a property of the earth formation.

In some configurations of the sensor and oscillator circuit, a non-monotonic response of the logging instrument can occur due to an electrical field component of the antenna coupling with the earth formation and a tool body return. In order to avoid the non-monotonic response, the teachings call for the oscillator circuit to be configured as symmetrical with respect to ground and described as ground symmetrical. To further avoid the residual non-monotonic response, the teachings disclose providing shielding to shield the antenna or coil of the sensor from electric fields but not from magnetic fields. Thus, the shielding shields the coil from electric fields while allowing a changing magnetic field to induce a current in the coil of the sensor.

Certain definitions are presented at this time for convenience. The term "oscillation criterion" relates to a condition of an oscillator circuit that indicates the circuit is oscillating. Non-limiting examples of the oscillation criterion include a nodal voltage and a circuit current. The term "circuit parameter" relates to a specific voltage or current in the oscillation circuit that causes the oscillation criterion to be satisfied and, therefore, causes the oscillation circuit to oscillate. The term "ground-symmetrical" relates to a circuit in which a path to ground through one terminal is a mirror image of the path to ground through another terminal in the circuit. The term "monotonic" relates to a curve (on a graph) or response of a sensor in which the curve or response does not have a reversal of slope. For example, a monotonic curve that has a negative slope will not have a portion of that curve with a positive slope.

In FIG. 1, an exemplary embodiment of a logging instrument 10 is shown disposed in a borehole 2. The logging instrument 10 has a longitudinal axis 8. The borehole 2 is drilled through the earth 3 and penetrates a formation 4. The formation 4 can have various layers 4A-4E. The logging instrument 10 is affixed to a drill string 17 that includes drill pipes 18. The drill string 17 also includes a drill bit 19 (or cutting device 19). In the embodiment of FIG. 1, the logging instrument 10 performs measurements of the formation 4 during drilling, referred to as logging-while-drilling (LWD), or while the drilling is temporarily halted. Further, in the embodiment of FIG. 1, a single sensor 12 is configured to measure resistivity of the earth formation 4 by inductively resonating (represented at 15) with the formation 4. The logging instrument 10 can also be used to determine a thickness of one of the layers 4A-4E in the formation 4 by detecting changes in the resistivity along the borehole 2.

In typical embodiments, the borehole 2 includes materials such as would be found in oil exploration, including a mixture of liquids such as water, drilling fluid, mud, oil and formation fluids that are indigenous to the various formations. It will be recognized that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

Referring to FIG. 1, the logging instrument 10 includes an electronic unit 6 coupled to the sensor 12. The electronic unit 6 is used in operation of the sensor 12. For example, the electronic unit 6 can receive data 16 related to a resistivity parameter measured by the sensor 12. The electronic unit 6 can store the data 16 for later retrieval and processing by a processing system 7. Alternatively, the electronic unit 6 can transmit the data 16 to the processing system 7 using a telemetry system. Non-limiting examples of the telemetry system include a pulsed-mud system and a communications system that transmits the data 16 in real time. A real time communications system may include a broadband cable affixed to the drill pipes 18.

Figure 2:
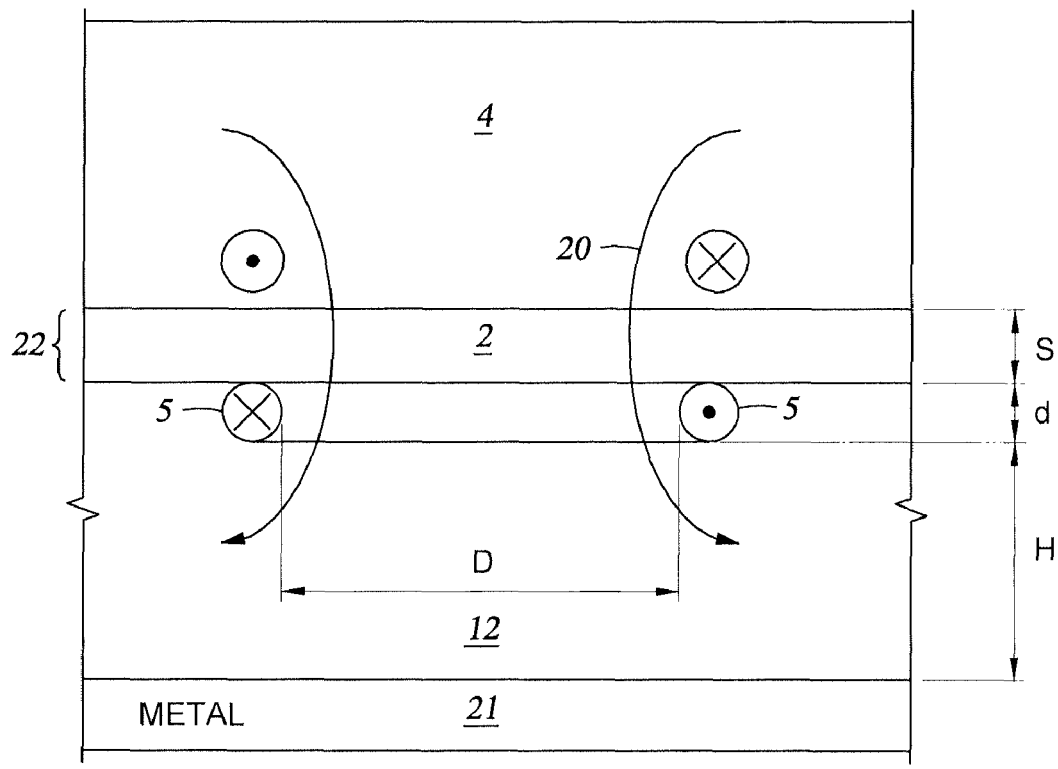
FIG. 2 depicts aspects of a single loop sensor principle.

Referring to FIG. 1, the sensor 12 includes a coil 5 (or antenna 5). FIG. 2 depicts aspects of the sensor 12 disposed at the logging instrument 10. In the embodiment of FIG. 2, the sensor 12 is mounted on a drill collar 21 in such a way that an associated magnetic moment 20 is perpendicular to the longitudinal axis 8 of the logging instrument 10. A mud gap 22 (or standoff 22, having standoff—s) exists between the sensor 12 and the formation 4 and is filled with a non-conductive drilling fluid having resistivity greater than the resistivity of the formation 4 at the frequency of operation, i.e., the non-conductive drilling fluid is resistive with respect to the resistivity of the formation 4. Although not shown in FIG. 2, a thin layer of dielectric (e.g., Peek) may be disposed between the coil 5 and the mud gap 22 for wear protection.

Figure 3:
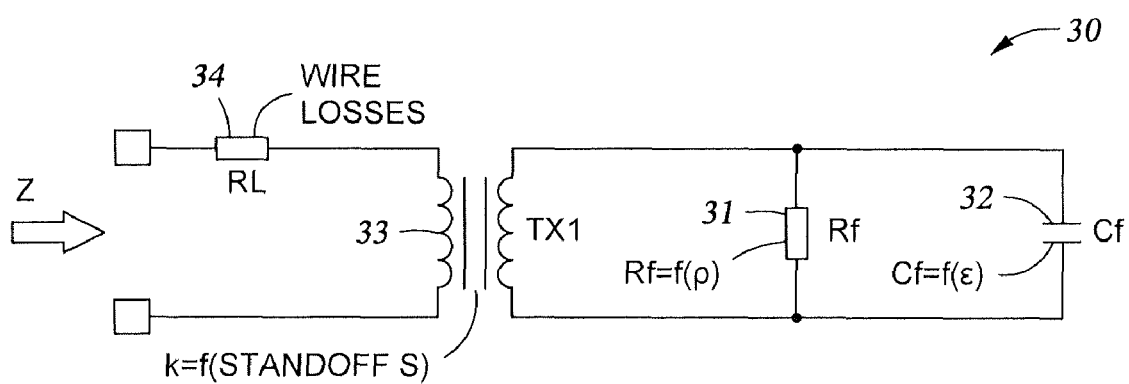
FIG. 3 depicts an electrical model of a loop antenna or coil coupled to an earth formation.

The principle of operation using the sensor 12 is presented using a single sensor electrical circuit model 30 shown in FIG. 3. The formation 4 is represented by the resistivity-dependent resistance Rf (31) and the permittivity-dependent capacitance Cf (32). This admittance is transformatorically coupled to the single loop coil 5, which is represented in FIG. 3 by the transformer primary 33 and the associated wire resistance RL (34). The coupling coefficient k is a function of the standoff 22.

Figure 4:
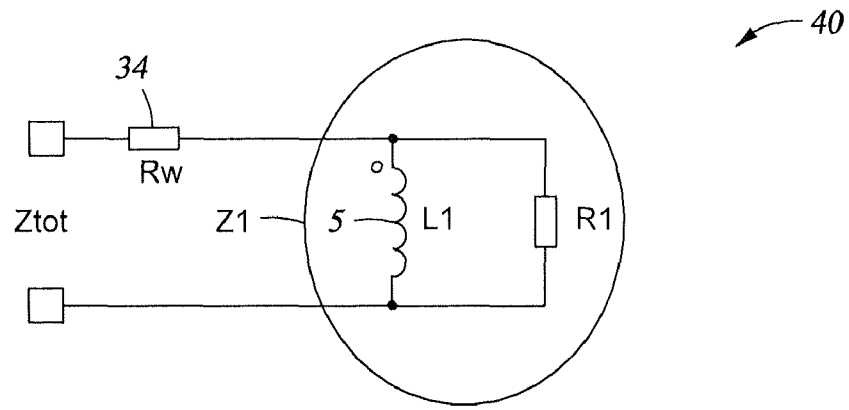
FIG. 4 illustrates a simplified circuit model of the electrical circuit.

The principle of operation using the sensor 12 is discussed further using a simplified circuit model 40 shown in FIG. 4. If the wire resistance Rw (34) was negligible, then R1, which is proportional to formation resistivity (Rf (31)) would be relatively easy to measure, since it is the inverse of the real part of the total admittance Ytot (Ytot=1/Ztot). Having presented that, the measurement frequency should be high enough so that the reactance $X_{L1}$ associated with L1 does not "short out" R1, leading to a practical measurement frequency range of approximately 50 to 150 MHz. However, Rw (34) is not negligible and dominates the real part of Ztot for resistivities>0.2 Ωm. In addition, Rw is also temperature-dependent.

To counter the effect of Rw (34), an active compensation of the wire losses is introduced. The active compensation basically includes a negative resistance in series with Rw (34). The resulting Ztot will still have to be measured by means of a directional coupler. Accurate measurement of resistivities greater than 20 Ωm already requires a very stable and precise compensation of Rw (34), which leads to the necessity for temperature compensation of the active compensation network. Temperature compensation is difficult in an actual measurement environment due to the absence of a high-impedance ("air") calibration standard. The requirement for precision compensation also leads to repeatability issues. The following points provide a summary of problems encountered with temperature compensation: (1) exact active compensation of wire losses difficult to achieve, (2) cannot fully compensate wire losses due to danger of oscillation, (3) repeatability problem of compensation setting, (4) large reflection coefficient measurement problem, (5) both real and imaginary part of the active compensation need to be adjusted over temperature, (6) these problems lead to non-repetitive measurement results at higher resistivities (>20 Ωm), and (7) reflection coefficient measurement accuracy is required to be very high.

To overcome the above enumerated problems, the active compensation is incorporated into an oscillator circuit to which the coil 5 is coupled. The active compensation is included as part of an active device in the oscillator circuit.

Figure 5:
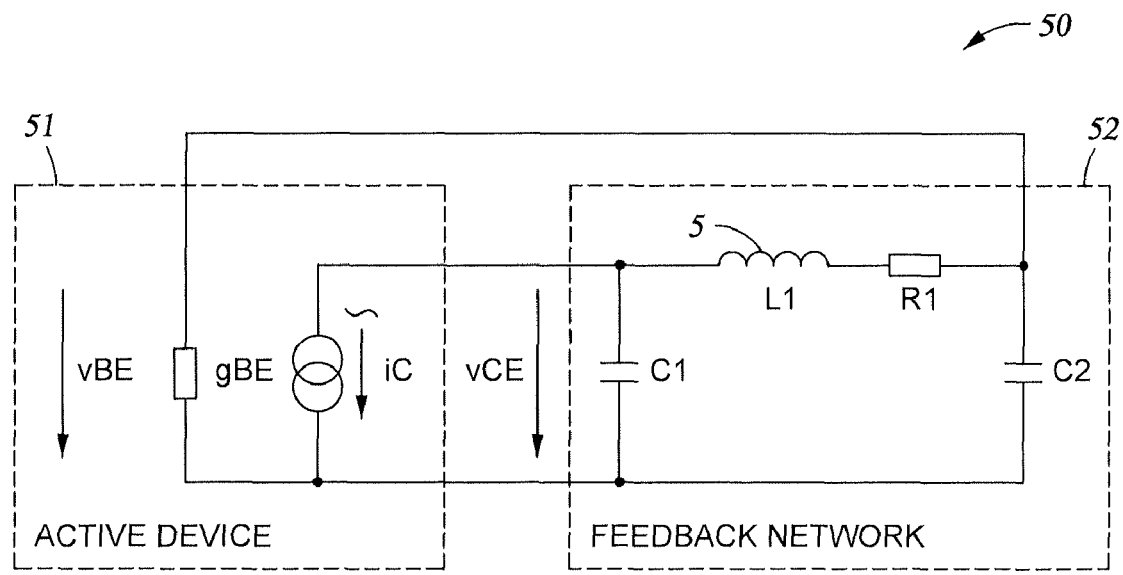
FIG. 5 depicts aspects of a basic Colpitts oscillator circuit.

FIG. 5 depicts aspects of a basic Colpitts oscillator circuit 50. The Colpitts oscillator circuit 50 includes an active device 51 and a feedback network 52, which includes the single loop coil 5 and two capacitors—C1 and C2. Both the active device 51 and the feedback network 52 provide 180° phase shift. Losses in the single loop coil 5 (wire losses and formation losses) are combined in R1. In the embodiment of FIG. 5, the active device 51 is a bipolar transistor whose transconductance is proportional to the direct-current (DC) collector current.

Figure 6:
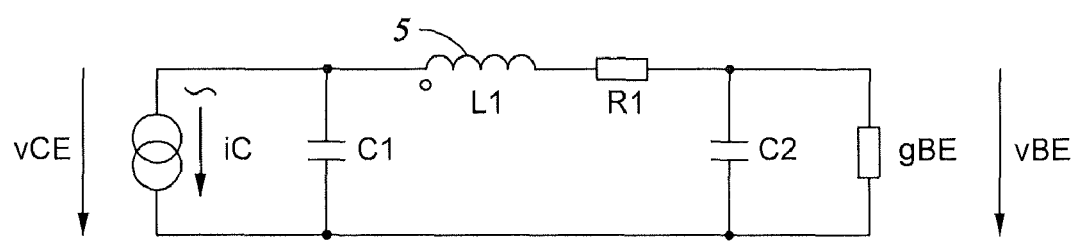
FIG. 6 illustrates a redrawn basic Colpitts oscillator circuit.

To derive the basic oscillation condition of the Colpitts oscillator circuit 50, the Colpitts oscillator circuit 50 depicted in FIG. 5 is redrawn as shown in FIG. 6.

Figure 7:
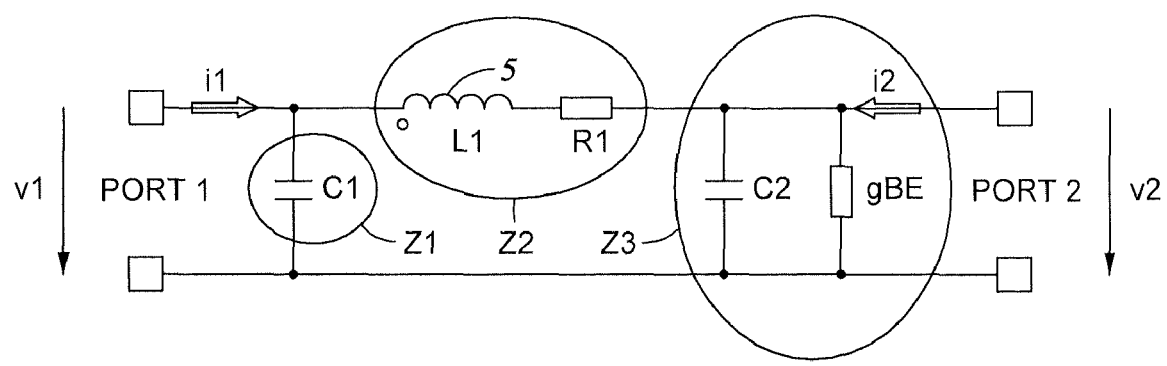
FIG. 7 illustrates the redrawn basic Colpitts oscillator circuit as a two-port network.

Referring to FIG. 6, the redrawn Colpitts oscillator circuit 50 can be treated as a two-port network as shown in FIG. 7.

The two-port oscillator network shown in FIG. 7, as with any two-port network, can be described by its Z-matrix as follows in equation (1):

$$\begin{bmatrix} v_1 \\ v_2 \end{bmatrix} = \begin{bmatrix} Z_{11} & Z_{12} \\ Z_{21} & Z_{22} \end{bmatrix} \cdot \begin{bmatrix} i_1 \\ i_2 \end{bmatrix} \quad (1)$$

A comparison of the Colpitts oscillator circuit 50 depicted in FIG. 6 with the circuit 50 depicted in FIG. 7 yields the following results:

$v_1 = v_{CE}$ $v_2 = v_{BE}$ $i_1 = -i_C$ $i_2 = 0$

These results together with equation (1) leads to equation (2).

$$\begin{bmatrix} v_{CE} \\ v_{BE} \end{bmatrix} = \begin{bmatrix} -Z_{11} \\ -Z_{21} \end{bmatrix} \cdot i_C \quad (2)$$

For the active device 51 being a bipolar transistor:

$$i_C = g_m \cdot v_{BE} \quad (3)$$

with $g_m$ being the transconductance of the active device 51. Substituting equation (3) into the lower line of equation (2) yields the oscillation condition:

$$-g_m \cdot Z_{21} = 1 \quad (4)$$

Using the nomenclature in FIG. 7, the transimpedance $Z_{21}$ of the two-port oscillator network shown in FIG. 7 can be expressed as in equation (5).

$$Z_{21} = \frac{Z_1 \cdot Z_3}{Z_1 + Z_2 + Z_3} \quad (5)$$

Since $Z_2$ contains the inductor losses (i.e., coil 5 losses), which for the single loop coil 5 are also dependent on the resistivity of the formation 4, $Z_2$ and in turn $Z_{21}$ become functions of the resistivity of the formation 4.

In order to still satisfy the oscillation condition for varying resistivities (ρ) of the formation 4, $g_m$ needs to be adjusted. This adjustment can be accomplished by the dependency of $g_m$ from the DC collector current of the bipolar transistor as shown in equation (6).

$$g_m = \frac{I_C}{V_T} \quad (6)$$

with $V_T$ being the thermal voltage. The thermal voltage is shown in equation (7):

$$V_T = \frac{k \cdot T}{e} \quad (7)$$

where k represents Boltzmann's constant, T represents temperature in degrees Kelvin, and e represents elementary charge. Thus, using the above dependencies, equation (4) can be rewritten as shown in equation (8) to yield the oscillation condition:

$$-g_m(I_C,T) \cdot Z_{21}(\rho,T) = 1 \quad (8)$$

Equation (8) shows that any change in the real part of $Z_{21}$ can be countered by adjusting $g_m$ through $I_C$. If the change in the real part of $Z_{21}$ is due to variations in the formation resistivity, then the DC collector current of the bipolar transistor becomes a measure of resistivity for a known and constant alternating-current (AC) collector-emitter voltage $V_{CE}$.

Figure 8:
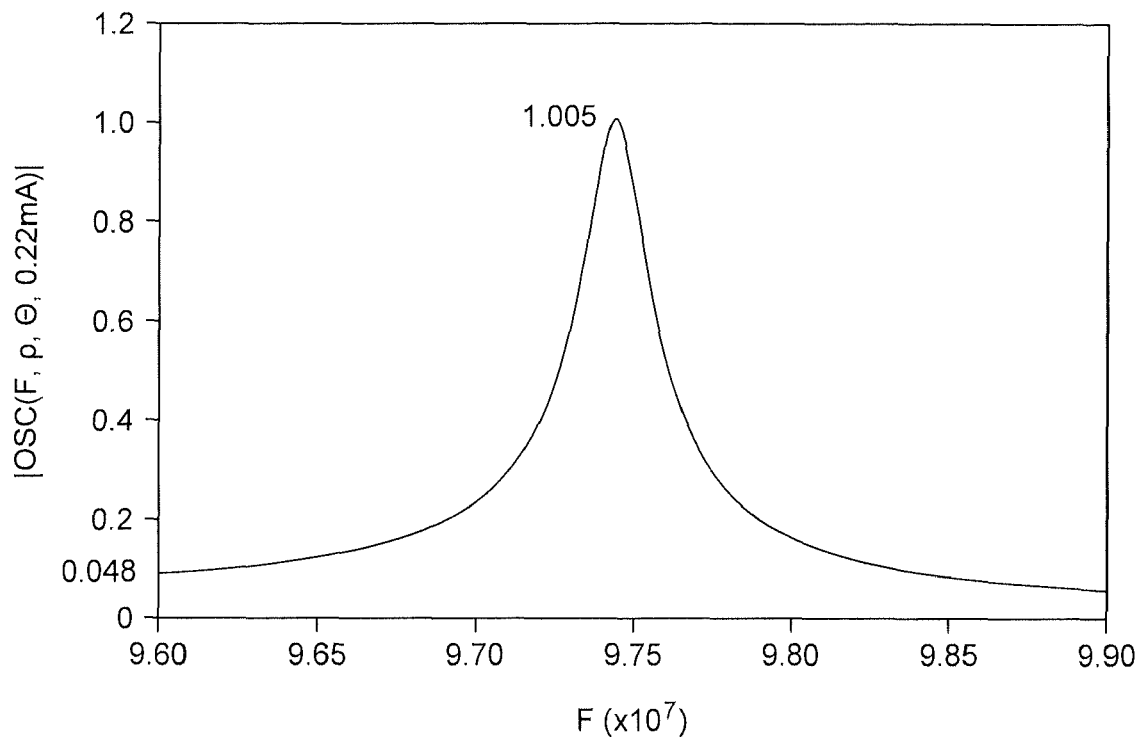
FIG. 8 illustrates results of modeling the Colpitts oscillator circuit that includes the single loop coil.
Figure 9:
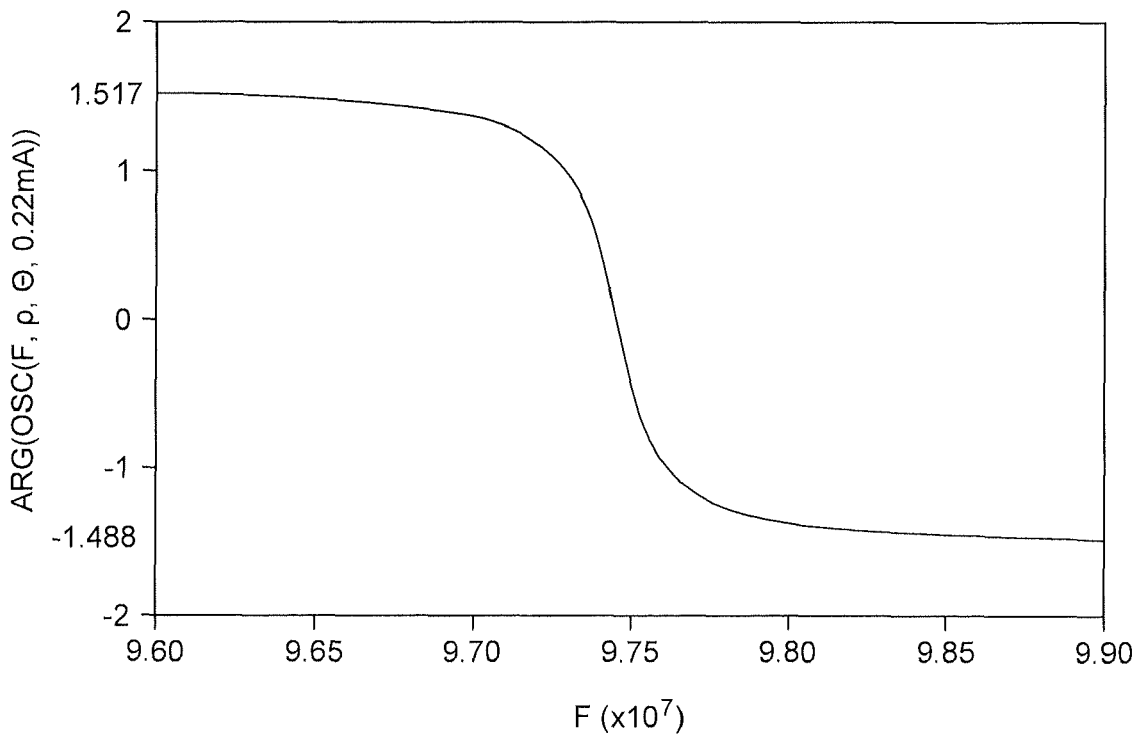
FIG. 9 illustrates results of modeling the Colpitts oscillator circuit that includes the single loop coil.

Using a mathematics program, the Colpitts oscillator circuit 50 shown in FIG. 5 was modeled with the parameters of the coil 5 and the oscillation condition computed. The DC collector current $I_C$ of one branch was varied until for a given resistivity of the formation 4 the oscillation condition was exactly met. It is noted here that in other embodiments a voltage proportional to $I_C$ can also be varied to meet the oscillation condition required for oscillation of the oscillation circuit 50 (i.e., a control voltage $V_{ctrl}$ of a voltage-controlled current source setting $I_C$). This voltage ($V_{ctrl}$) can also be used as a measure of the resistivity of the formation 4. The results of the modeling are shown in FIGS. 8 and 9.

Figure 10:
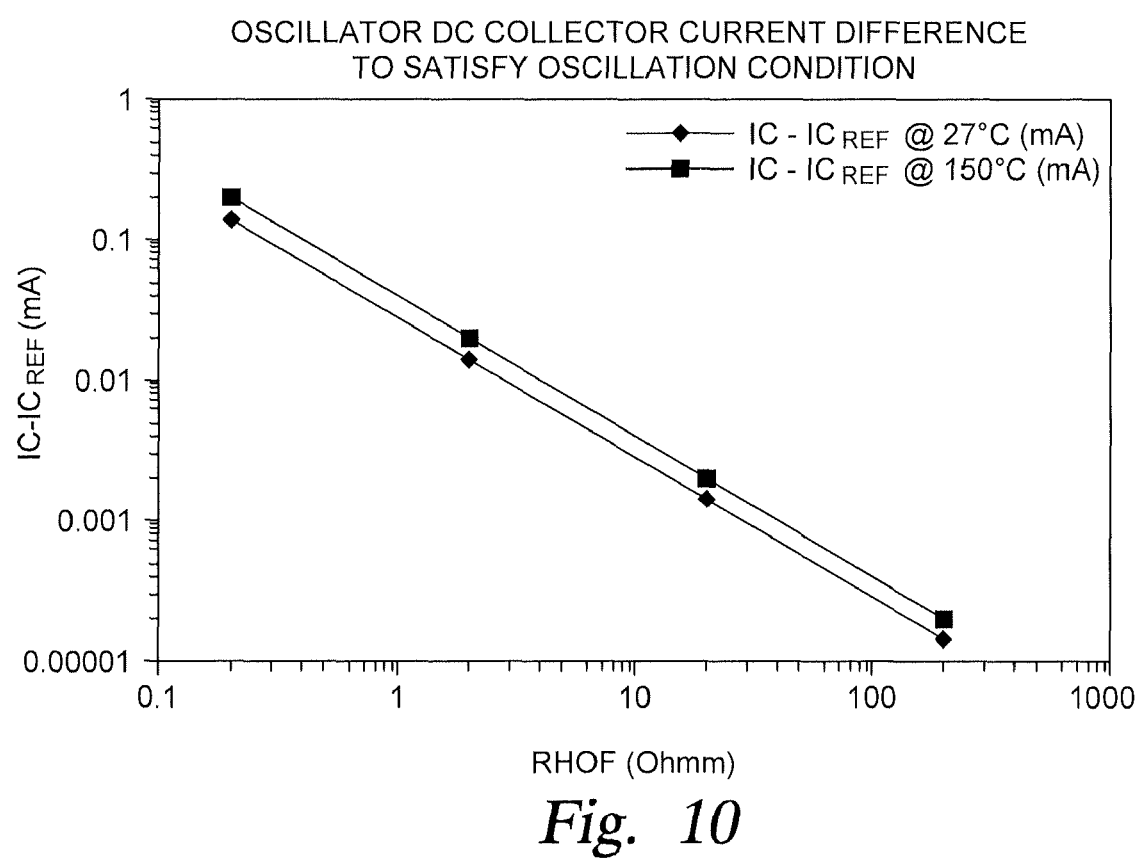
FIG. 10 illustrates sensor responses for two different temperatures.

The analytical model of the Colpitts oscillator circuit 50 contains normally seen values for capacitances, the inductance of the single loop coil 5, and wire resistance. The model then computes the effects of the resistivity of the formation 4 and the temperature of the active device 51. Using the analytical model, a formation resistivity sweep with temperature as a model parameter was conducted with the results shown in FIG. 10. Several items should be noted with respect to FIG. 10:
(1) Instead of the collector current $I_C$, the difference between $I_C$ and a reference current $I_{C,ref}$ is shown;
(2) $I_{C,ref}$ is the collector current to satisfy the oscillation condition in free air (e.g. with infinite formation resistivity);
(3) $I_{C,ref}$ is temperature dependent; and
(4) $I_C - I_{C,ref}$ vs. formation resistivity is also temperature dependent, mainly due to the temperature dependency of $g_m$.

Figure 11:
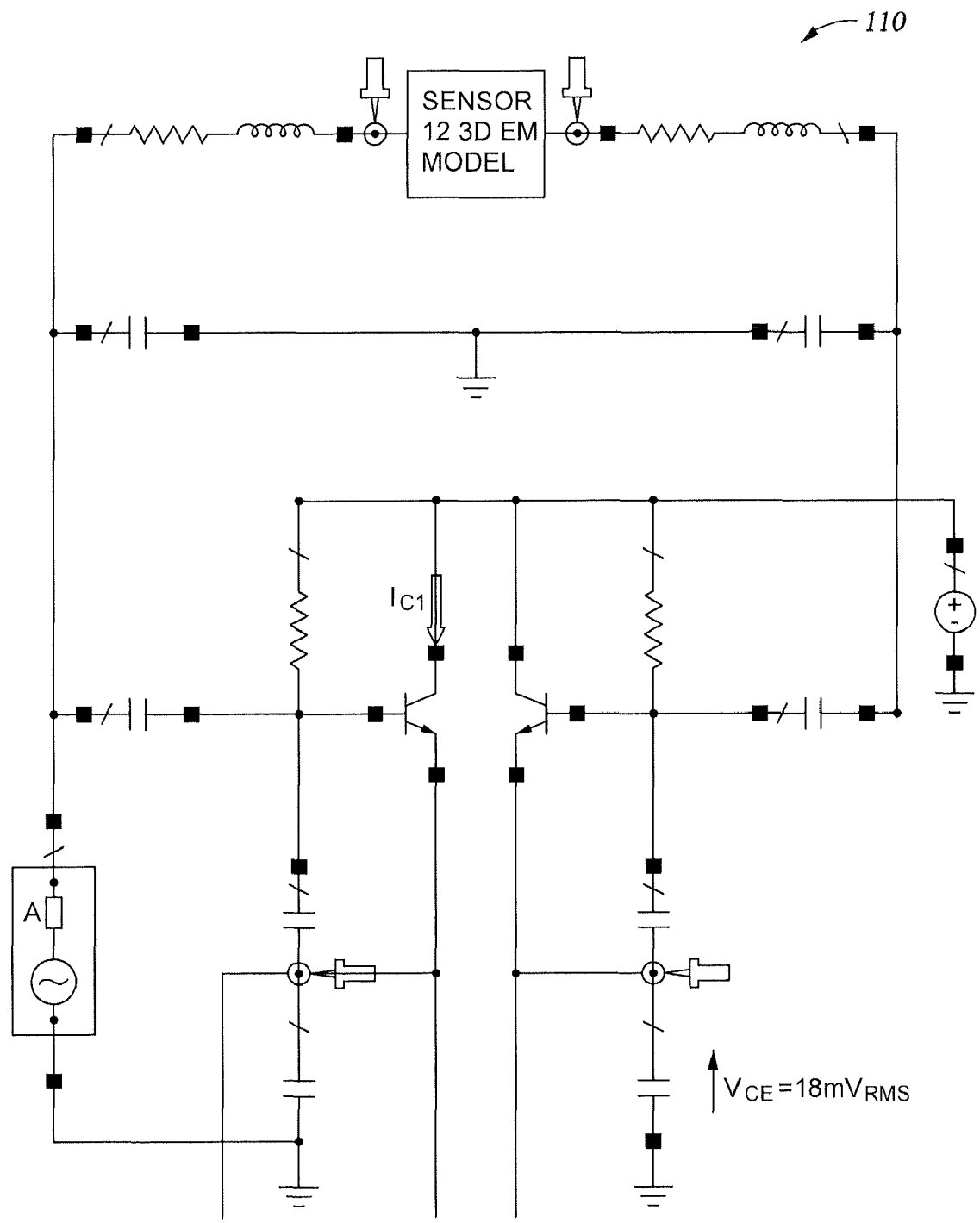
FIG. 11 illustrates as exemplary embodiment of a ground-symmetrical oscillator circuit.
Figure 12:
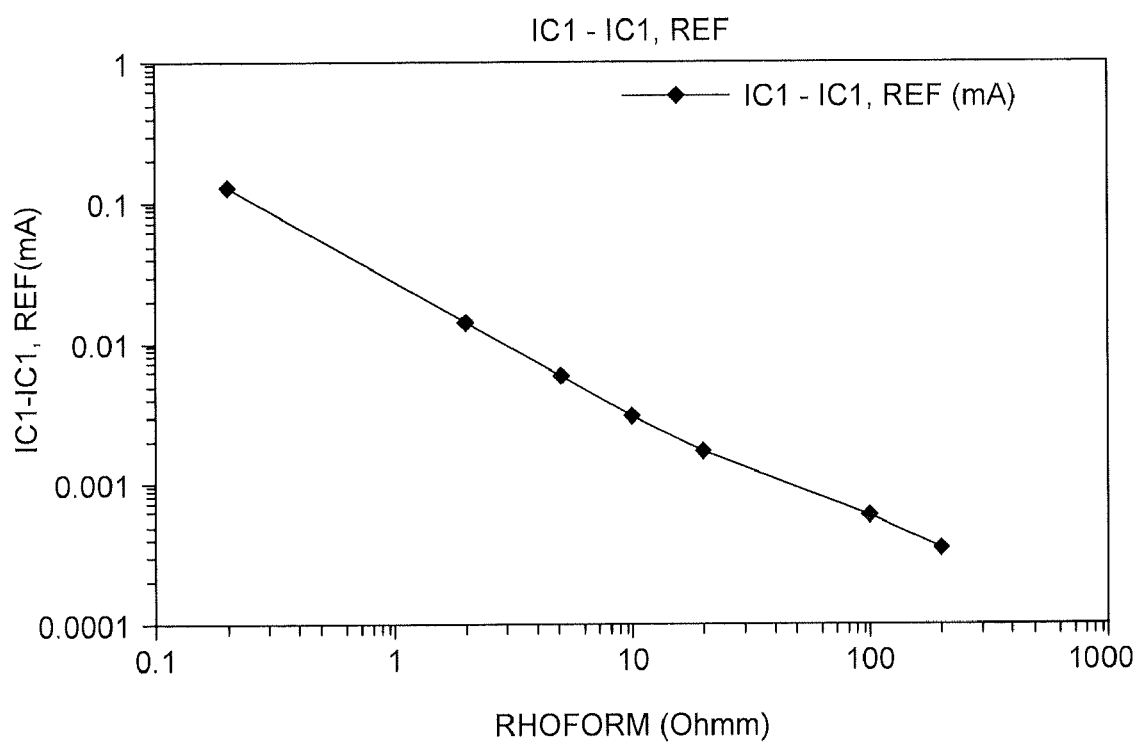
FIG. 12 illustrates a simulated response of the ground-symmetrical oscillator circuit with respect to earth formation resistivity.

FIG. 11 illustrates as exemplary embodiment of a ground-symmetrical Clapp oscillator circuit 110 that includes the single loop coil 5 as an inductor. Using three-dimensional (3D) electromagnetic (EM) simulation results for a nominal standoff of 3 mm, infinite mud resistivity, and a permittivity of 81 for the formation 4 (same as for the analytical calculation used to generate FIG. 10), the ground-symmetrical oscillator circuit 110 was simulated. The results of the simulation of the circuit 110 are shown in FIG. 12. The ground symmetry depicted in the ground-symmetrical oscillator circuit 110 is important to avoid non-monotonic behavior due to the electrical field component coupling with the formation 4 and the tool body return. A harmonic-balance simulator was used to accurately simulate the steady-state nonlinear circuit behavior.

The oscillation condition in equation (8) yields the minimum DC collector current for which the oscillator circuit will yield a constant, steady-state radio-frequency (RF) voltage at any of its nodes. Therefore, the RF collector-emitter voltage (collector is grounded with respect to the RF voltage) of one of the branch transistors in FIG. 11 is used as an oscillation parameter to determine a (arbitrary) steady-state condition. In this example, $v_{CE}$=18 mVrms was chosen.

Figure 13A:
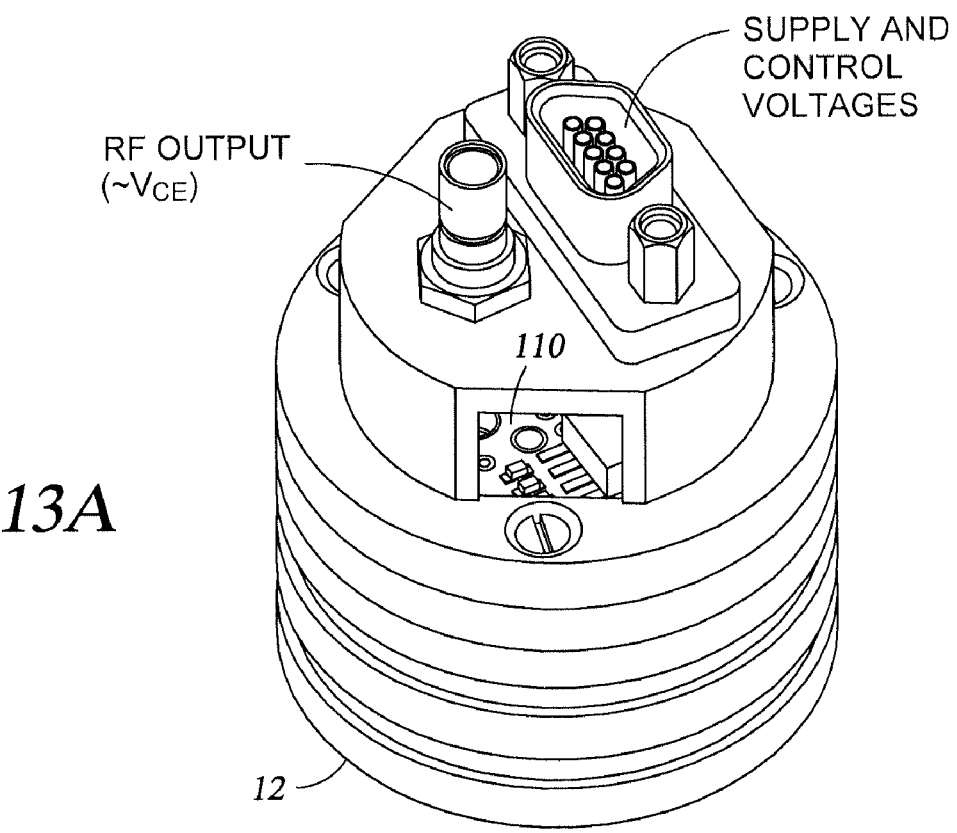
FIGS. 13A and 13B, collectively referred to as FIG. 13, illustrate aspects of mechanical design of a sensor that includes the single loop coil and the ground-symmetrical oscillator circuit.
Figure 13B:
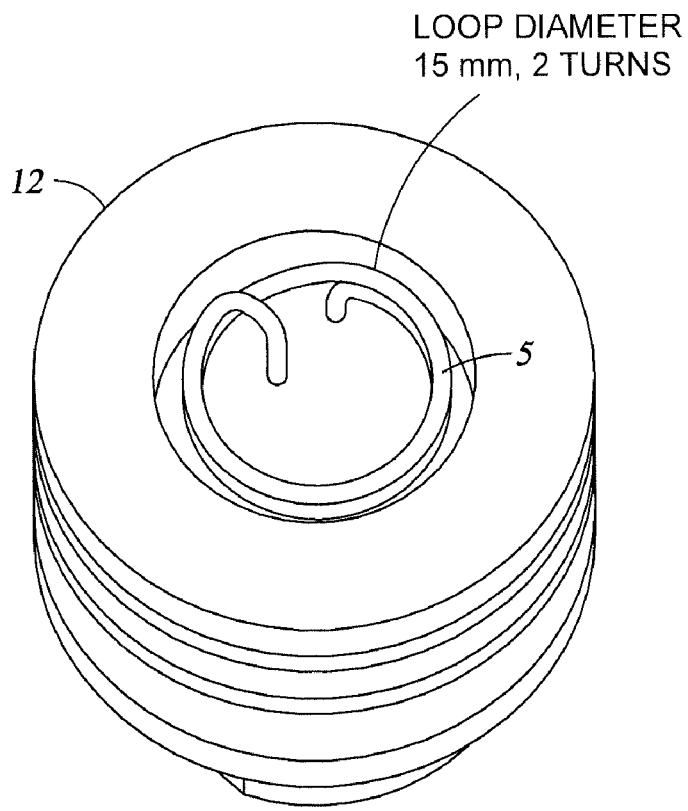
Figure 14:
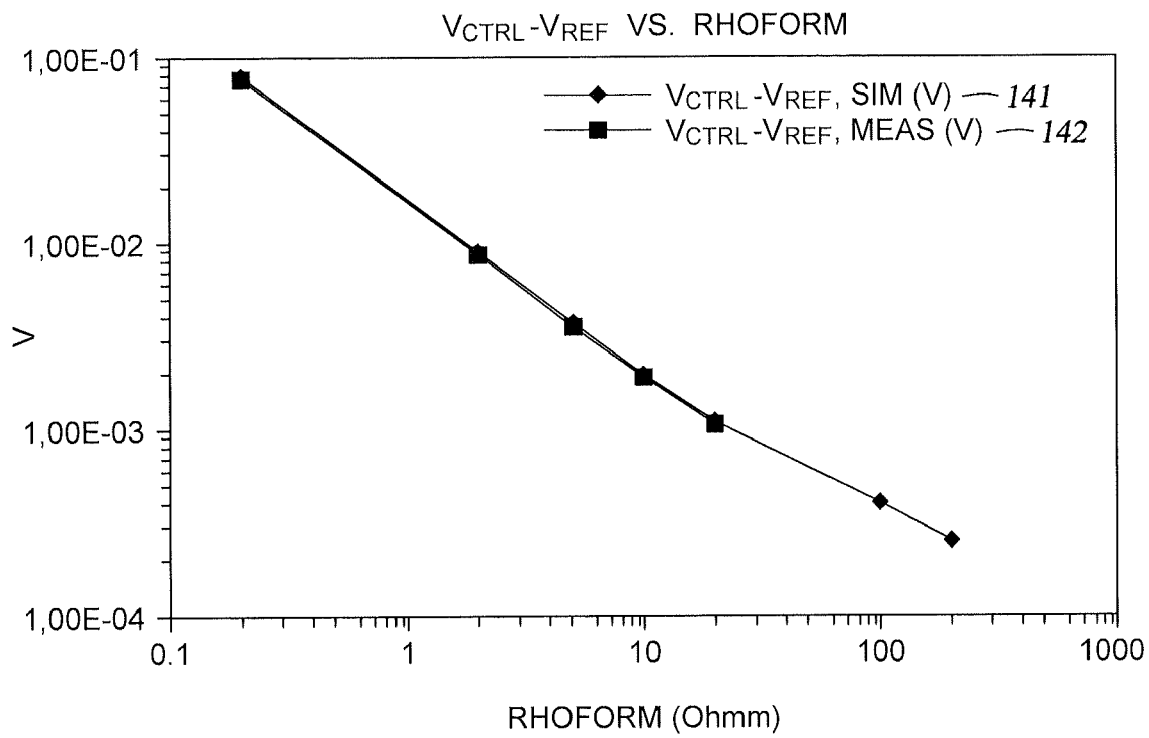
FIG. 14 illustrates results of a test of the sensor.

FIG. 13 depicts aspects of the mechanical design of the sensor 12. Referring to FIG. 13A, the sensor 12 includes the coil 5 and the ground-symmetrical oscillator circuit 110 (or the oscillator circuit 50). The coil 5 in the embodiment of FIG. 13 has two turns. The collector currents are set by use of a voltage-controlled voltage source with the control voltage $V_{ctrl}$ where $I_C$ is proportional to $V_{ctrl}$. The frequency of the oscillator circuit 110 used in the embodiment of FIG. 13 is 100 MHz. The measured dependency for measuring the resistivity of the formation 4 is $V_{ctrl} - V_{ref} = f(\rho)$ for $V_{CE}$=constant=18 $mV_{rms}$. A test on the embodiment of the sensor 12 in FIG. 13 was performed using a test tub with a saltwater solution ($\in_r$=81, 0.2 $\Omega m \leq \rho \leq 20$ $\Omega m$) and a nominal standoff of 3 mm filled with air. The results of the test are shown in FIG. 14. Curve 141 shows the simulated sensor 12 response from FIG. 12. Curve 142 shows the measured response using the sensor 12 in the embodiment of FIG. 13.

Figure 15:
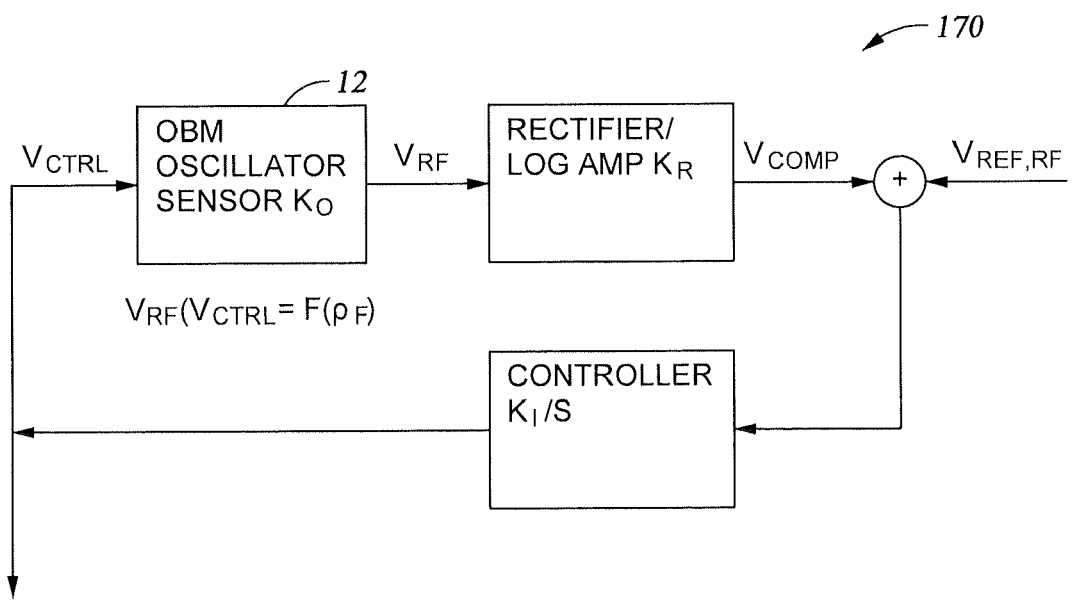
FIG. 15 illustrates a block diagram of an exemplary embodiment of a control loop for controlling a collector-emitter voltage of the active device.

The collector currents could be manually adjusted via $V_{ctrl}$ until the AC collector-emitter voltage was met ($v_{CE}$=18 $mV_{rms}$). However, this is not practical in a downhole tool and therefore, a control loop 170 illustrated by a block diagram in FIG. 15 is used to adjust $V_{CE}$. After the control loop 170 has settled, $V_{ctrl}$ is used as a measure of the formation resistivity, or to be more precise $V_{ctrl} - V_{ref}$ is used with $V_{ref}$ being the control voltage of the sensor in free air. The steady-state RF condition is set by $V_{ref,RF}$, which is subtracted from $V_{comp}$. $V_{comp}$ is the rectified sensor RF output voltage $V_{RF}$.

A test was conducted using the coil 5 in the oscillator circuit 110 together with the control loop 170. The test was used to measure the resistivity of an artificial formation.

Figure 16:
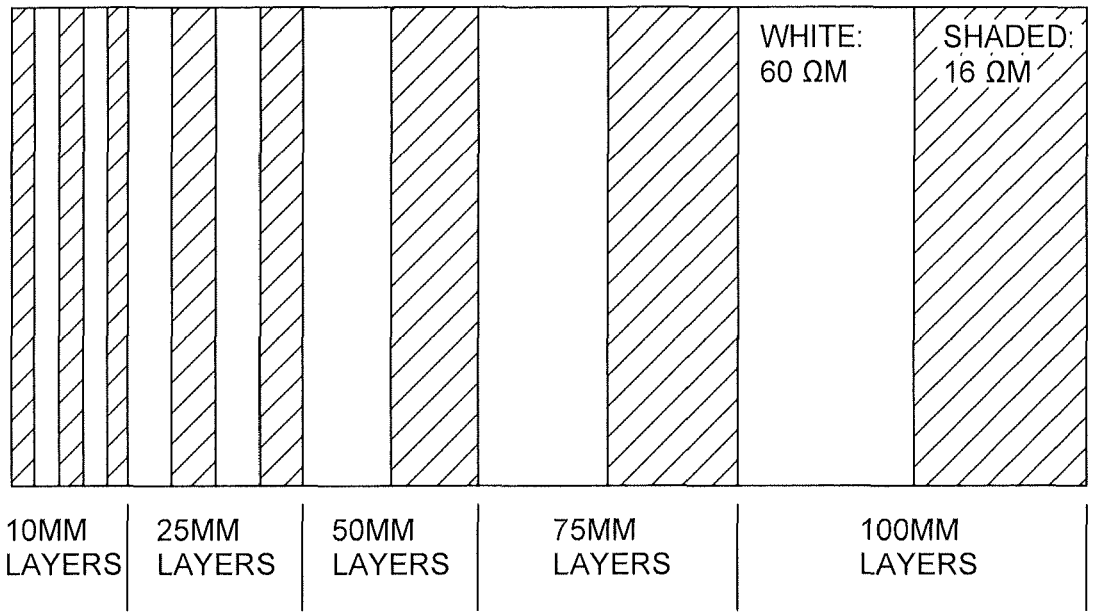
FIG. 16 illustrates an artificial structure used for simulating the earth formation.
Figure 17:
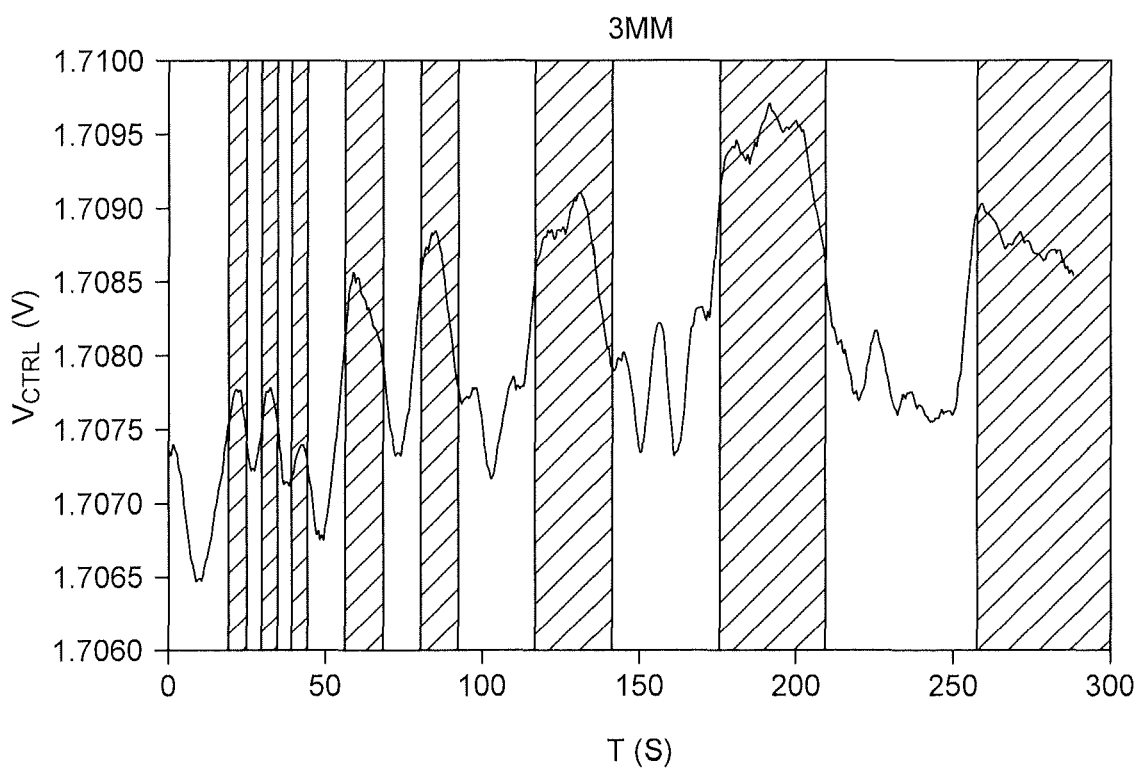
FIG. 17 illustrates results of testing the sensor with the control loop using the artificial formation.

FIG. 16 illustrates the structure of the artificial formation. FIG. 17 presents the results of the test with the mud simulated by air and a standoff of 3 mm.

Figure 18:
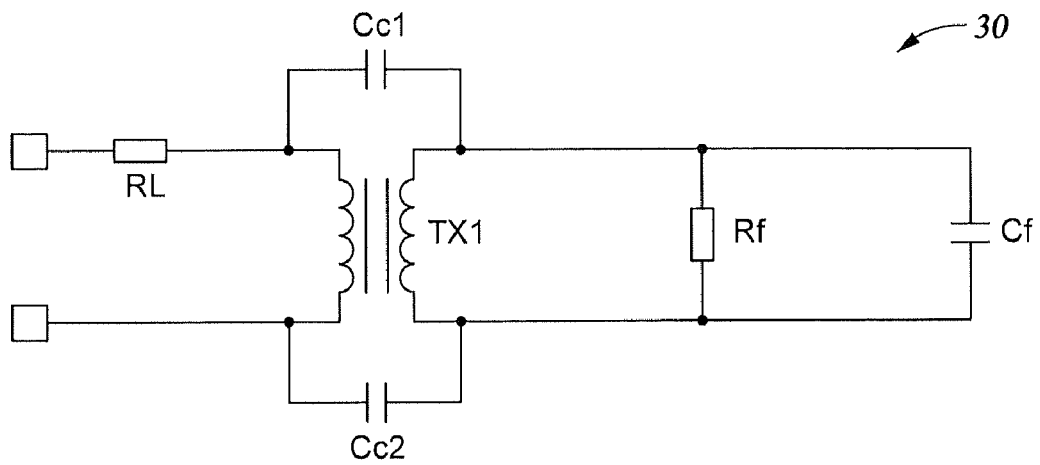
FIG. 18 depicts aspects of capacitive coupling using the model of the electrical circuit coupled to the single loop coil.
Figure 19:
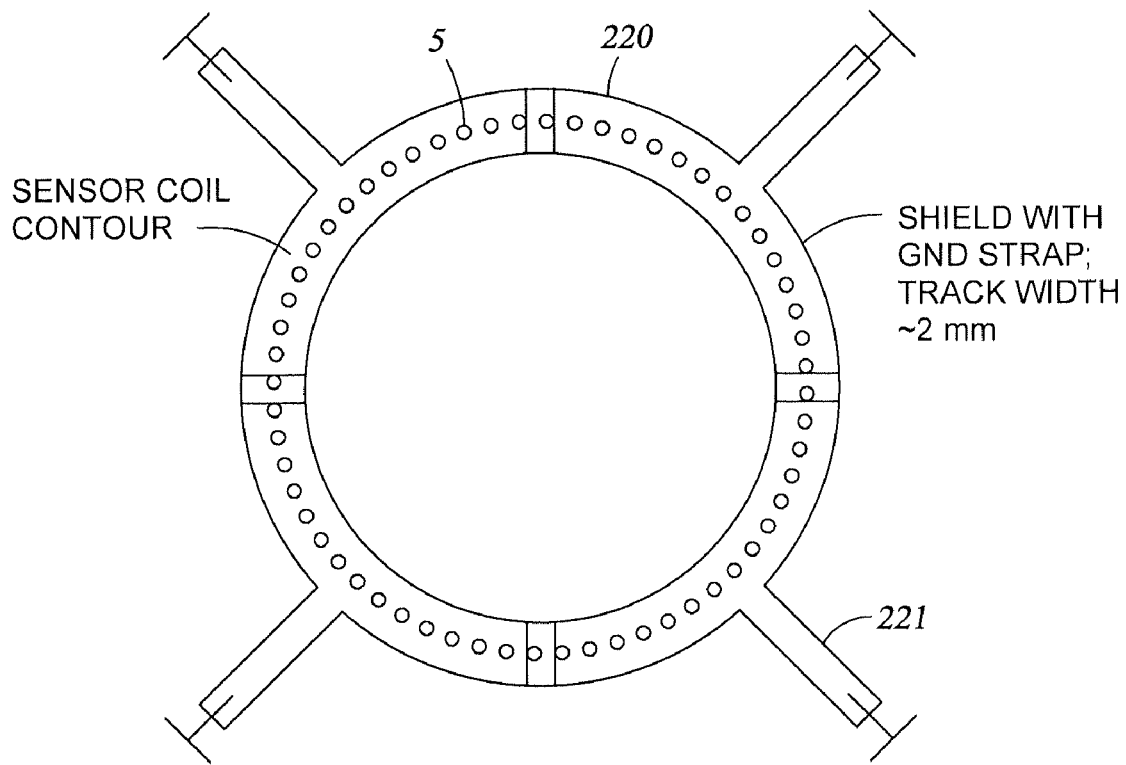
FIG. 19 illustrates an exemplary embodiment of a shield for shielding the single loop coil from an electric field.

In addition to the inductive coupling, a capacitive coupling exists between the coil 5 and the formation 4. FIG. 18 depicts aspects of capacitive coupling using the single sensor electrical circuit model 30 shown in FIG. 3. Referring to FIG. 18, capacitive coupling is modeled by Cc1 and Cc2. Effectively, the sensor 12 will respond to capacitive coupling and, thus, the response of the oscillator circuit 50 will deviate from the ideal, inductive-only response. The superposition of the inductive coupling and the capacitive coupling causes the response of the oscillator circuit 50 to become flat to non-monotonic for certain combinations of resistivity and permittivity of the formation 4. The ground-symmetric oscillator circuit 110 greatly mitigates the effect of capacitive coupling. In addition, shielding of the coil 5 from an electric field but not from a magnetic field will further suppress the capacitive coupling. FIG. 19 illustrates an exemplary embodiment of a shield 220 mounted several millimeters above the coil 5. In one embodiment, the shield 220 is made of copper foil and glued to a plastic cover. The shield 220 in this embodiment is grounded, via ground straps 221, to a case supporting the coil 5.

Figure 20:
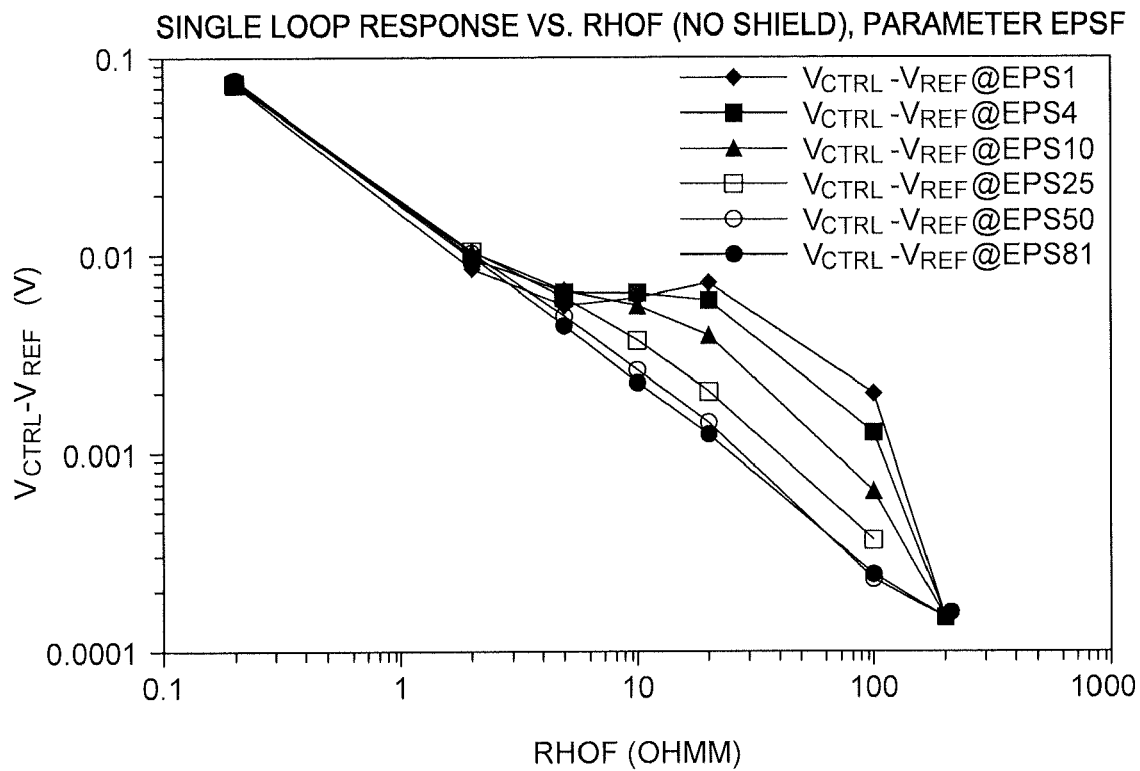
FIG. 20 illustrates responses of the ground-symmetrical oscillator circuit with the single loop coil not shielded.
Figure 21:
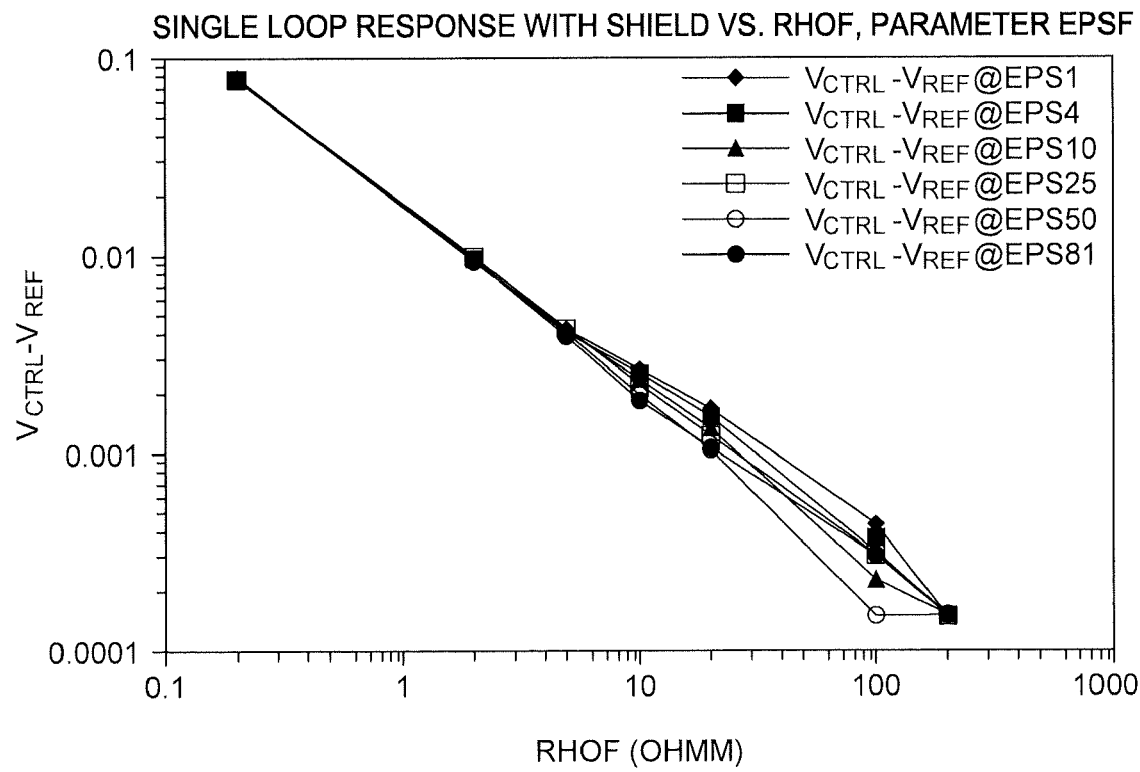
FIG. 21 illustrates responses of the ground-symmetrical oscillator circuit with the single loop coil shielded.

To test the effect of the shield 220, computer simulations were performed to obtain responses from the ground-symmetrical oscillator circuit 110 with and without the shield 220. FIG. 20 presents responses of the ground-symmetrical oscillator circuit 110 with the coil 5 not shielded for various permittivities. FIG. 21 presents responses of the ground-symmetrical oscillator circuit 110 with the coil 5 shielded for the same various permittivities. Comparing FIG. 20 to FIG. 21, it can be seen that the spread of the responses due to the various permittivities is reduced by use of the shield 220. In addition, the responses are completely monotonic when the shield 220 is used.

Figure 22:
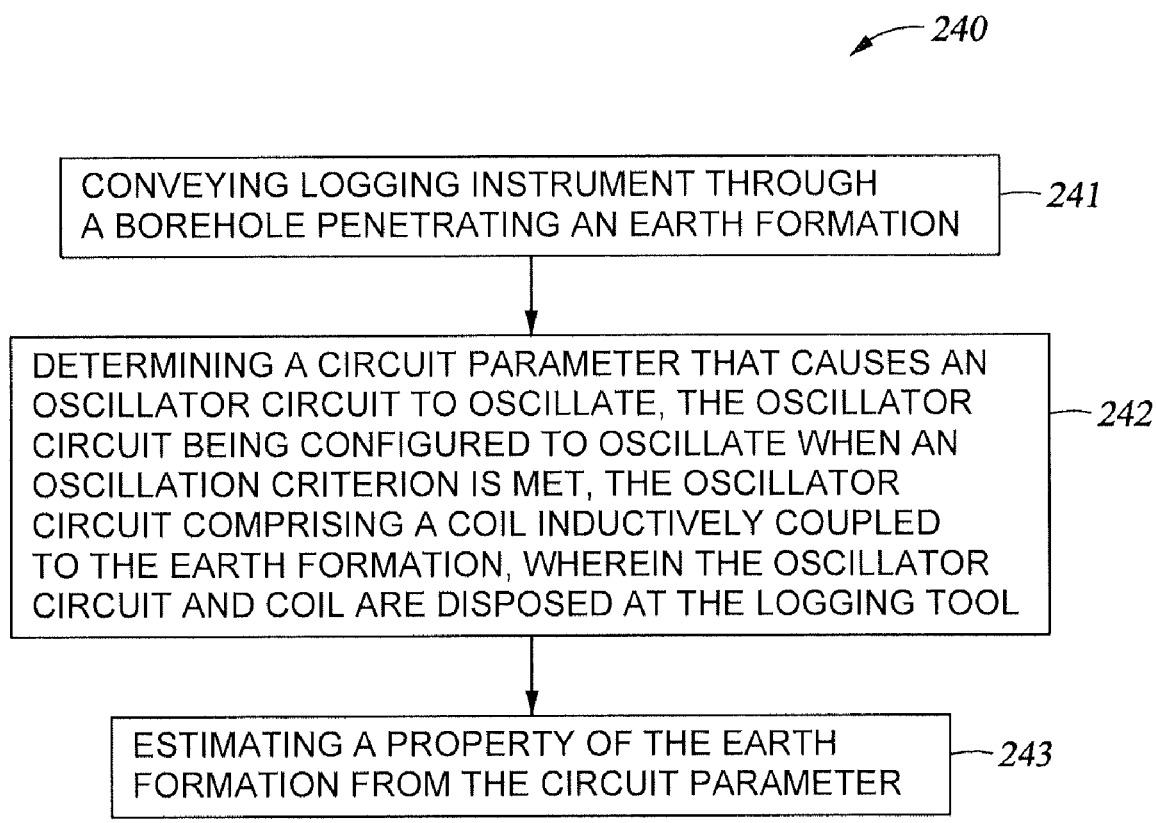
FIG. 22 presents one example of a method for evaluating the earth formation using the sensor.

FIG. 22 presents one example of a method 240 for evaluating the earth formation 4. The method 240 calls for (step 241) conveying the logging tool 10 through the borehole 2 penetrating the earth formation 4. Further, the method 240 calls for (step 242) determining a circuit parameter that causes an oscillator circuit to oscillate, the oscillator circuit being configured to oscillate when an oscillation criterion is met, the oscillator circuit includes the coil 5 inductively coupled to the earth formation 4. The oscillator circuit and coil are disposed at the logging tool. Further, the method 240 calls for (step 243) estimating a property of the earth formation 4 from the oscillation parameter.

The teachings disclosed embodiments of the logging instrument 10 being configured for LWD applications. The logging instrument 10 can also be configured for being conveyed in the borehole 2 by wireline, slickline, or coil tubing as known in the art. However, only in the LWD case, a resistivity image of the formation 4 will be sampled with just one downhole sensor. In other embodiments, the logging tool 10 can have more than one sensor 12 to evaluate the earth formation 4.

In support of the teachings herein, various analysis components may be used, including a digital and/or an analog system. For example, the electronic unit 6 and/or the processing system 7 can include the digital and/or the analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for evaluating an earth formation, the apparatus comprising:
   a logging tool configured to be conveyed through a borehole penetrating the earth formation;
   a single coil inductively coupled to the earth formation and configured to transmit and receive an electromagnetic signal in resonance with the earth formation, the single coil being disposed at the logging tool;
   a circuit coupled to the coil wherein the circuit and the coil form an oscillator circuit comprising an active device, the oscillator circuit being configured to oscillate when a circuit parameter of the oscillator circuit satisfies an oscillation criterion, the circuit parameter comprising a current conducted through the active device and being related to a property of the earth formation; and
   a control circuit coupled to the active device and configured to automatically adjust the circuit parameter.

2. The apparatus of claim 1, wherein the oscillator circuit comprises at least one of a Colpitts oscillator circuit and a Clapp oscillator circuit.

3. The apparatus of claim 1, wherein the oscillator circuit comprises ground symmetry.

4. The apparatus of claim 1, further comprising a coil carrier with a relative permeability of at least one.

5. The apparatus of claim 4, wherein the coil carrier comprises at least one of ferrite and powdered iron.

6. The apparatus of claim 1, wherein a moment of the coil is perpendicular to a longitudinal axis of the logging tool.

7. The apparatus of claim 1, wherein the oscillation criterion comprises a radio-frequency (RF) nodal voltage or RF current of the oscillator circuit.

8. The apparatus of claim 1, wherein the active device comprises a transistor comprising at least one of a bipolar transistor, a junction field effect transistor (JFET), and a metal oxide semiconductor FET (MOSFET).

9. The apparatus of claim 8, wherein the circuit parameter comprises a direct current (DC) collector or drain current of the transistor that satisfies the oscillation criterion of the earth formation and is a measure of resistivity of the earth formation.

10. The apparatus of claim 9, wherein the DC collector or drain current is represented by a voltage.

11. The apparatus of claim 8, wherein the circuit parameter comprises a difference between a direct-current (DC) collector or drain current of the transistor that satisfies the oscillation criterion for the earth formation and a reference DC collector or drain current for the transistor that satisfies the oscillation criterion in free air, the circuit parameter being a measure of resistivity of the earth formation.

12. The apparatus of claim 11, wherein at least one of the DC collector or drain current and the reference DC collector or drain current is represented by a voltage.

13. The apparatus of claim 1, further comprising a conductive shield disposed between the coil and the earth formation.

14. The apparatus of claim 13, wherein the shield is grounded to the logging tool.

15. The apparatus of claim 1, wherein the property comprises at least one of resistivity and a thickness of a layer.

16. The apparatus of claim 1, wherein the apparatus is configured for being conveyed in the borehole by at least one of a wireline, a drill string, a slickline, and coiled tubing.

17. A method for evaluating an earth formation, the method comprising:

conveying a logging tool through a borehole penetrating the earth formation;

determining a circuit parameter that causes an oscillator circuit to oscillate using a control circuit coupled to an active device of the oscillator circuit and configured to automatically adjust the circuit parameter, the oscillator circuit being configured to oscillate when the circuit parameter comprising a current conducted through the active device satisfies an oscillation criterion, the oscillator circuit comprising a single coil inductively coupled to the earth formation and configured to transmit and receive an electromagnetic signal in resonance with the earth formation, wherein the oscillator circuit and coil are disposed at the logging tool; and estimating a property of the earth formation from the circuit parameter.

18. The method of claim 17, wherein the property comprises at least one of resistivity and a thickness of a layer.

19. The method of claim 17, wherein the oscillator circuit provides a monotonic response of the circuit parameter for a varying property of the earth formation.

* * * * *